US009022705B2

(12) United States Patent
Shibata et al.

(10) Patent No.: US 9,022,705 B2
(45) Date of Patent: May 5, 2015

(54) ELECTRICAL POWER TOOLS

(75) Inventors: Yoshinori Shibata, Anjo (JP); Takuji Kimura, Anjo (JP)

(73) Assignee: Makita Corporation, Anjo-Shi (JP)

( * ) Notice: Subject to any disclaimer, the term of this patent is extended or adjusted under 35 U.S.C. 154(b) by 940 days.

(21) Appl. No.: 13/205,064

(22) Filed: Aug. 8, 2011

(65) Prior Publication Data

US 2012/0045290 A1 Feb. 23, 2012

(30) Foreign Application Priority Data

Aug. 19, 2010 (JP) ................................. 2010-184121

(51) Int. Cl.
*B23C 1/10* (2006.01)
*B27C 5/10* (2006.01)

(52) U.S. Cl.
CPC ......... *B27C 5/10* (2013.01); *Y10T 409/306608* (2015.01); *Y10T 409/307952* (2015.01)

(58) Field of Classification Search
CPC .................................... B27C 5/10; B23C 1/10
USPC ............. 409/182, 181, 206, 209; 144/136.95, 144/154.5
See application file for complete search history.

(56) References Cited

U.S. PATENT DOCUMENTS 1,532,683 A * 4/1925 Carter ........................ 144/134.1
1,565,790 A * 12/1925 Carter ........................... 409/182
2,988,119 A * 6/1961 Damijonaitis et al. ... 144/136.95
3,106,133 A * 10/1963 Arpaio, Jr et al. ............ 409/178
3,207,193 A * 9/1965 Godfrey et al. ............ 144/144.1
3,767,948 A * 10/1973 Batson ..................... 144/136.95
4,239,428 A * 12/1980 Berzina .......................... 409/182
4,640,324 A * 2/1987 Lounds ...................... 144/154.5
4,652,191 A * 3/1987 Bernier .......................... 409/182
5,613,813 A * 3/1997 Winchester et al. .......... 409/182
6,634,838 B2 * 10/2003 Kitamura et al. ............. 409/235
6,779,954 B2 8/2004 Tomayko
7,121,775 B2 * 10/2006 Onose et al. .................. 409/182
7,275,900 B1 * 10/2007 Phillips et al. ................ 409/182
7,473,058 B2 * 1/2009 Zhu ................................ 409/182
7,481,253 B2 * 1/2009 Hummel .................. 144/136.95
7,946,138 B2 * 5/2011 Thompson et al. ............. 65/510

FOREIGN PATENT DOCUMENTS

JP A-9-164503 6/1997
JP A-2005-305683 11/2005

* cited by examiner

*Primary Examiner* — Daniel Howell
*Assistant Examiner* — Nicole N Ramos
(74) *Attorney, Agent, or Firm* — Oliff PLC

(57) ABSTRACT

An electrical power tool may include a base capable of contacting the work-piece, a tool main body detachably attached to the base, and an elevating mechanism that is capable of changing a relative position of the tool main body to the base. The elevating mechanism includes a male elevating member that is releasably integrated with the tool main body, a female elevating member that is attached to the base and is capable of relatively raising and lowering the male elevating member, and an integrating mechanism that is capable of releasably integrating the male elevating member with the tool main body. The tool main body is capable of being removed from the base while the male elevating member is left in the base when the male elevating member is released from the tool main body by operating the integrating mechanism.

11 Claims, 8 Drawing Sheets

ELECTRICAL POWER TOOLS

BACKGROUND OF THE INVENTION

1. Field of the Invention

The present invention relates to electrical power tools. More particularly, the present invention relates to electrical power tools that are constructed to trim or groove work-pieces such as woody materials.

2. Description of Related Art

An electrical power tool that is constructed to trim or groove a work-piece such as a woody material is generally known. Such an electrical power tool is called as a router or trimmer. The electrical power tool includes a tool main body having a spindle, and a base that is capable of supporting the tool main body and contacting the work-piece. In the electrical power tool, it is necessary to determine a position of a tool bit relative to the work-piece. Generally, in order to determine the position of the tool bit relative to the work-piece, a relative position of the tool main body to the base is determined, so that a relative position of the tool main body to the work-piece is determined. Thus, the position of the tool bit relative to the work-piece can be determined.

Such an electrical power tool is taught, for example, by U.S. Pat. No. 6,779,954 and Japanese Laid-Open Patent Publication Number 9-164503. The electrical power tool includes an elevating (raising and lowering) mechanism that is capable of adjusting the position of the tool bit relative to the work-piece. The elevating mechanism includes a threaded ring that is rotatably attached to the base. The threaded ring is threadably engaged with the tool main body. Therefore, when the threaded ring is rotated, the tool main body can be raised or lowered relative to the base, so that the relative position of the tool main body to the base can be changed or adjusted.

Such an electrical power tool is also taught, for example, by Japanese Laid-Open Patent Publication Number 2005-305683. The electrical power tool includes an elevating (raising and lowering) mechanism that is capable of adjusting the position of the tool bit relative to the work-piece. The elevating mechanism includes a threaded housing that is formed in the tool main body. The threaded housing is threadably engaged with the base. Therefore, when the threaded housing is rotated, the tool main body can be raised or lowered relative to the base, so that the relative position of the tool main body to the base can be adjusted. The elevating mechanism further includes a securing mechanism that is capable of selectively securing the threaded housing (the tool main body) to predetermined desired positions on the base. The securing mechanism has a lever that is capable of moving between a securing position and a releasing position, so that the threaded housing can be easily secured to and released from the base in one operation.

Generally, in some cases, the electrical power tool can be used while the tool main body is separated or detached from the base. That is, the tool main body can be used separately in some cases. In such a case, the tool main body must be removed from the base. However, in order to remove the tool main body from the base, a complicated and time-consuming work may be required. Thus, there is a need in the art for an improved electrical power tool.

BRIEF SUMMARY OF THE INVENTION

In one aspect of the present invention, an electrical power tool to process a work-piece such as a woody material may include a base having a base surface that is capable of contacting the work-piece, a tool main body detachably attached to the base and having a spindle to which a tool bit can be attached, and an elevating mechanism that is capable of changing a relative position of the tool main body to the base. The elevating mechanism includes a male elevating member that is releasably integrated with the tool main body, a female elevating member that is attached to the base and is capable of relatively raising and lowering the male elevating member, and an integrating mechanism that is capable of releasably integrating the male elevating member with the tool main body. The tool main body is capable of being removed from the base while the male elevating member is left in the base when the male elevating member is released from the tool main body by operating the integrating mechanism.

According to this aspect, the tool main body can be removed from the base while the male elevating member is left in the base. Therefore, it is not necessary to disengage the female elevating member from the male elevating member in order to remove the tool main body from the base. As a result, the tool main body can be easily and quickly removed from the base. In addition, the removed tool main body can be directly used separately from the base without any additional operations.

Optionally, the male elevating member may have outer teeth. Conversely, the female elevating member may have a ring shape and have inner tooth meshing with the outer teeth of the male elevating member. The outer teeth of the male elevating member and the inner tooth of the female elevating member may respectively be shaped such that the male elevating member can be raised and lowered relative to the female elevating member when the female elevating member is rotated relative to the male elevating member.

Further, the male elevating member may engage the tool main body at both end portions in a raising and lowering direction thereof. The integrating mechanism may include an engagement release lever that is arranged and constructed to release the male elevating member from the tool main body.

Other objects, features and advantages of the present invention will be readily understood after reading the following detailed description together with the accompanying drawings and the claims.

DETAILED DESCRIPTION OF THE INVENTION

A representative embodiment of the present invention will now be described in detail with reference to FIGS. 1 to 8.

In this embodiment, a router or trimmer is exemplified as an electrical power tool 10. As will be recognized, the router (trimmer) is a device that is constructed to trim or groove a work-piece L such as a woody material. Further, an up and down direction in the description corresponds to a vertical direction of FIGS. 1, 2 and 5-8.

Figure 1:
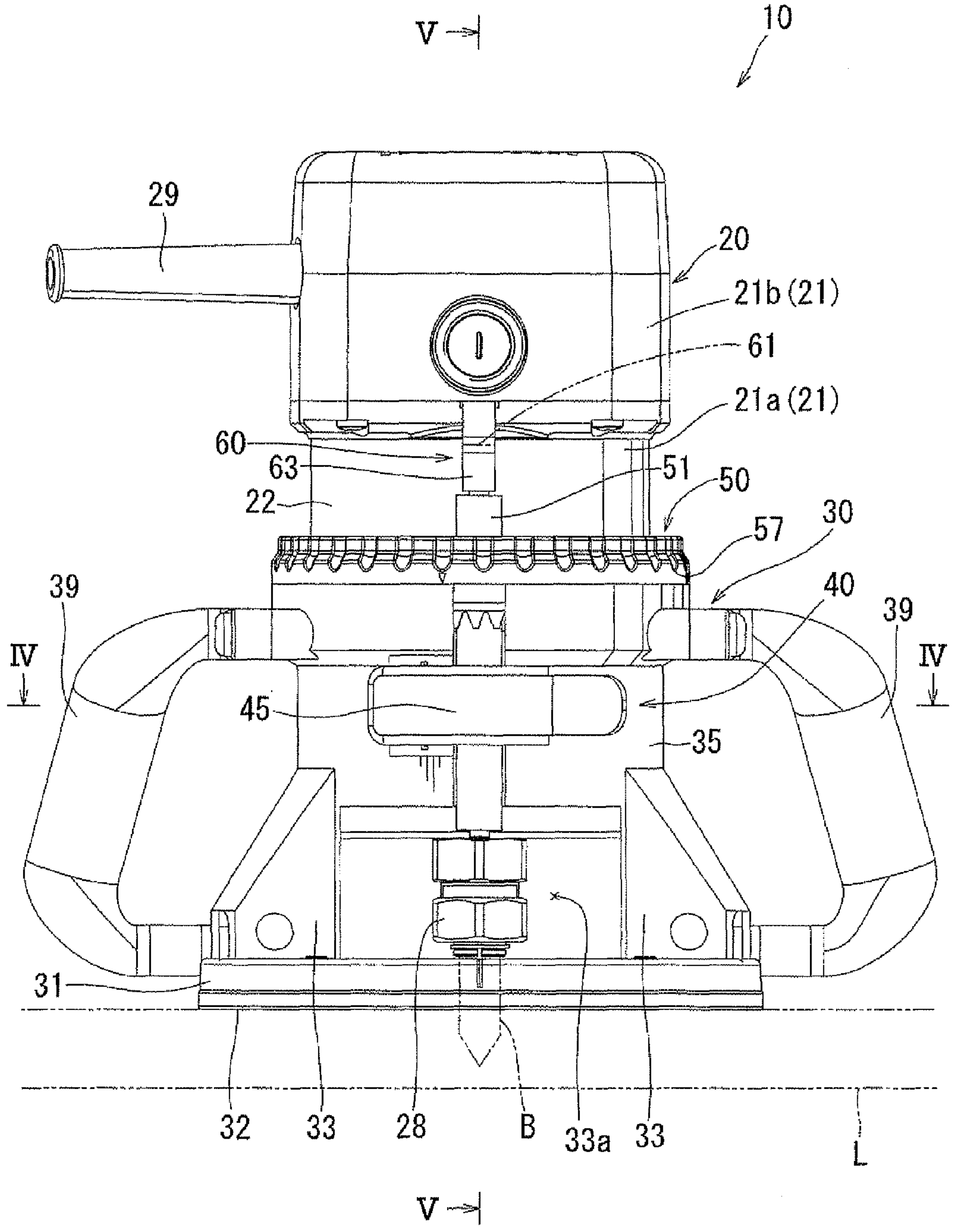
FIG. 1 is an elevational view of an electrical power tool according to a representative embodiment of the present invention, in which a tool main body is attached to a base.
Figure 2:
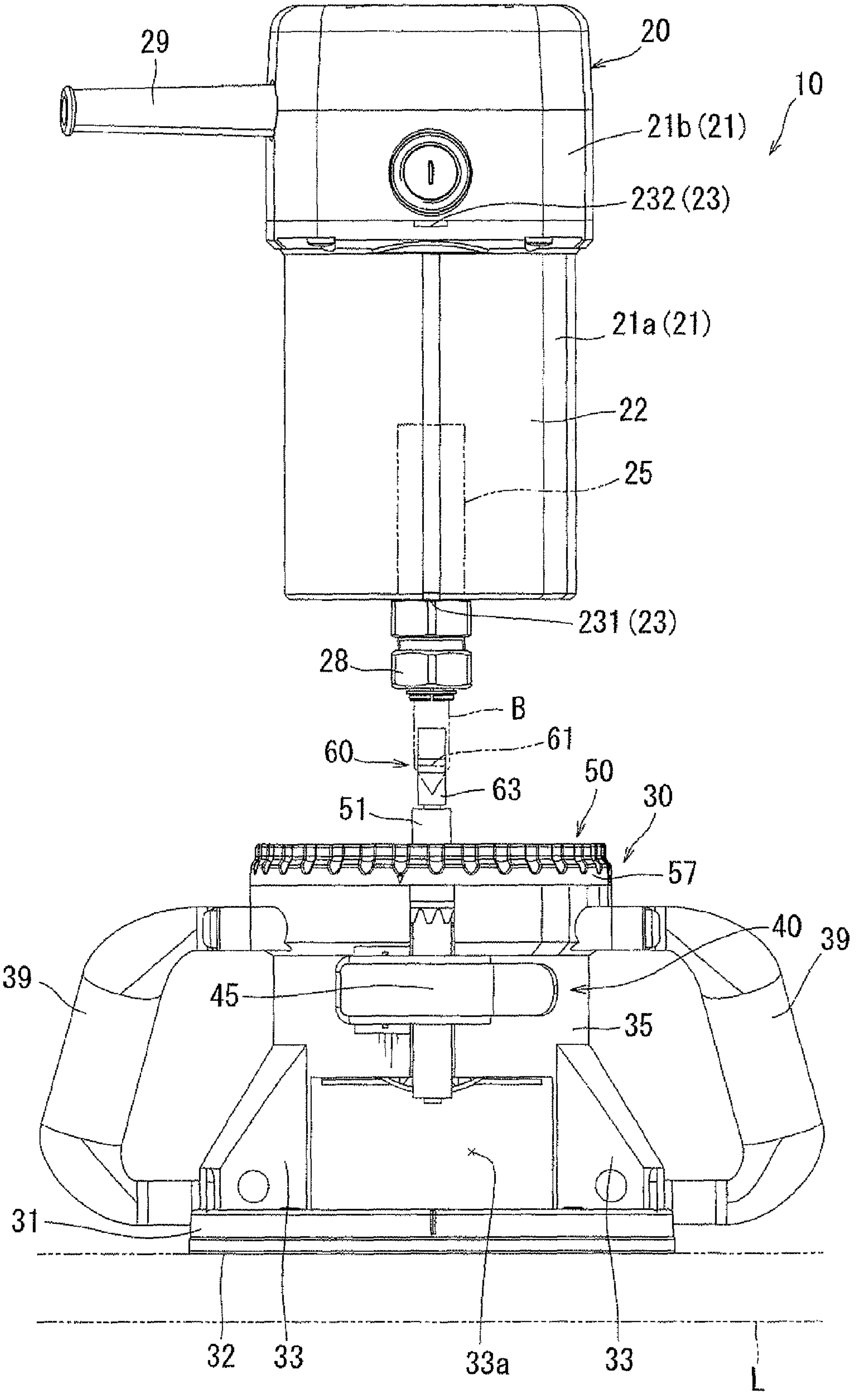
FIG. 2 is an elevational view of the electrical power tool, in which the tool main body is separated from the base.

As shown in FIGS. 1 and 2, the electrical power tool 10 may include a tool main body 20, and a base 30 that is capable of supporting the tool main body 20. The electrical power tool 10 thus constructed is disposed on the work-piece L while the base 30 contacts the work-piece L, so as to process (trim or groove) the work-piece L. Further, the electrical power tool 10 may include an elevating (raising and lowering) mechanism 50 that is capable of raising and lowering the tool main body 20 to adjust a (relative) position of the tool main body 20 to the base 30, and a securing mechanism 40 that is capable of securing the tool main body 20 to the base 30 at an adjusted position.

As shown in FIGS. 1 and 2, the tool main body 20 may include a housing 21, a drive motor unit (not shown) received in the housing 21, a spindle 25 (FIG. 2) coaxially positioned in the housing 21, and a tool bit B attached to the spindle 25 via a chuck mechanism 28. The drive motor unit may preferably include a brush motor (not shown) that is electrically connected to an external power source (not shown) via a supply cord 29. The spindle 25 is associated with the drive motor unit, so as to be rotated thereby. Upon rotation of the spindle 25, the tool bit B can be spun, so that the work-piece L can be processed. Further, the chuck mechanism 28 may preferably be a collet cone that is attached to a lower end of the spindle 25.

As shown in FIG. 2, the housing 21 includes a substantially cylindrical portion 21*a* corresponding to a lower half thereof and an enlarged head portion 21*b* corresponding to an upper half thereof. The cylindrical portion 21*a* of the housing 21 has an outer circumferential surface 22 having a substantially uniform outer diameter over the entire length thereof. The cylindrical portion 21*a* (the outer circumferential surface 22) of the housing 21 may preferably be shaped to be introduced into the base 30, so that the housing 21 can be slidably coupled to the base 30. Thus, the tool main body 20 can be vertically movably supported on or attached to the base 30. Conversely, the head portion 21*b* of the housing 21 may preferably be arranged and constructed to not be introduced into the base 30. Therefore, the head portion 21*b* of the housing 21 cannot be introduced into the base 30 even after the cylindrical portion 21*a* is fully introduced into the base 30. That is, the head portion 21*b* of the housing 21 can constantly be exposed exteriorly.

Figure 3:
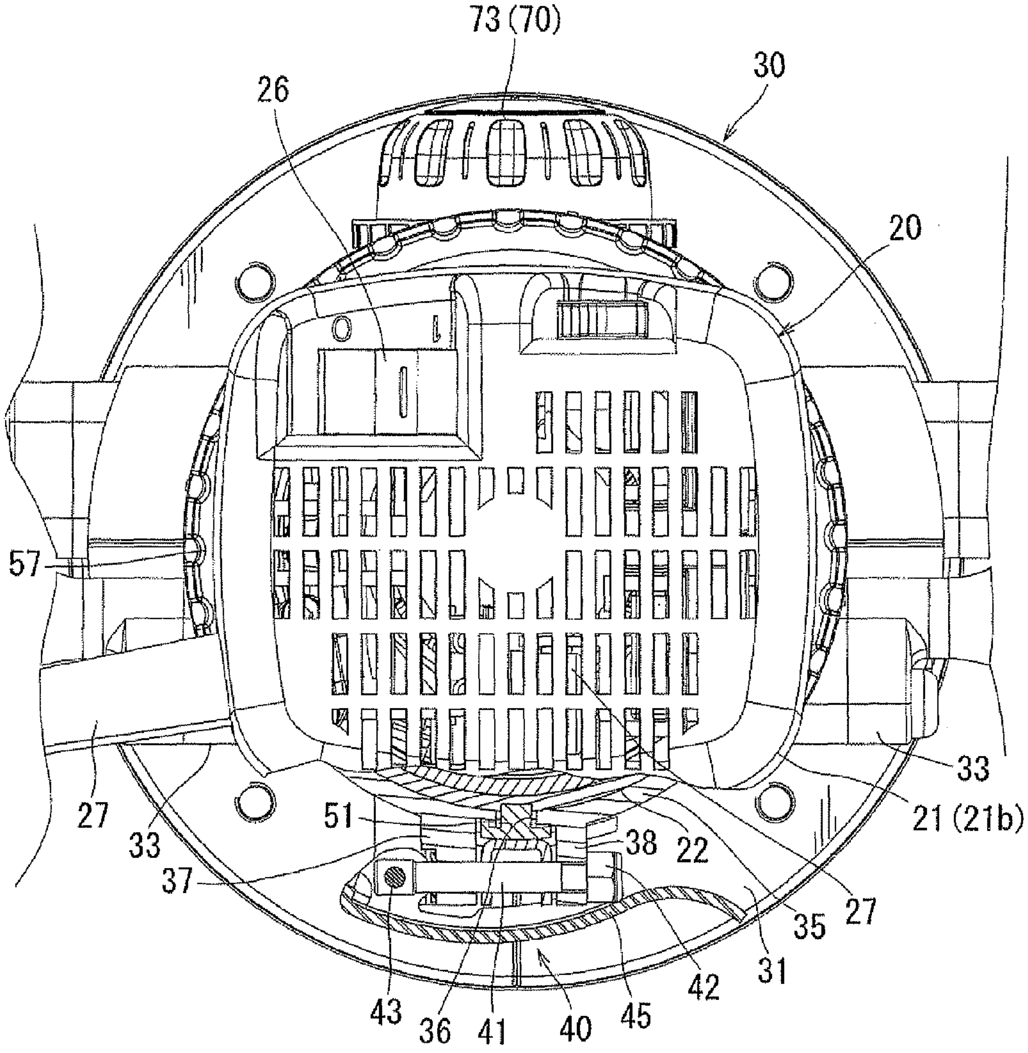
FIG. 3 is a partially cross-sectional plan view of the electrical power tool.

As shown in FIG. 3, a power switch 26 (a seesaw switch) is attached to an upper surface of the head portion 21*b* of the housing 21. Further, ventilation slots 27 are formed in the upper surface of the head portion 21*b*, so that the drive motor unit can be effectively cooled.

Figure 4:
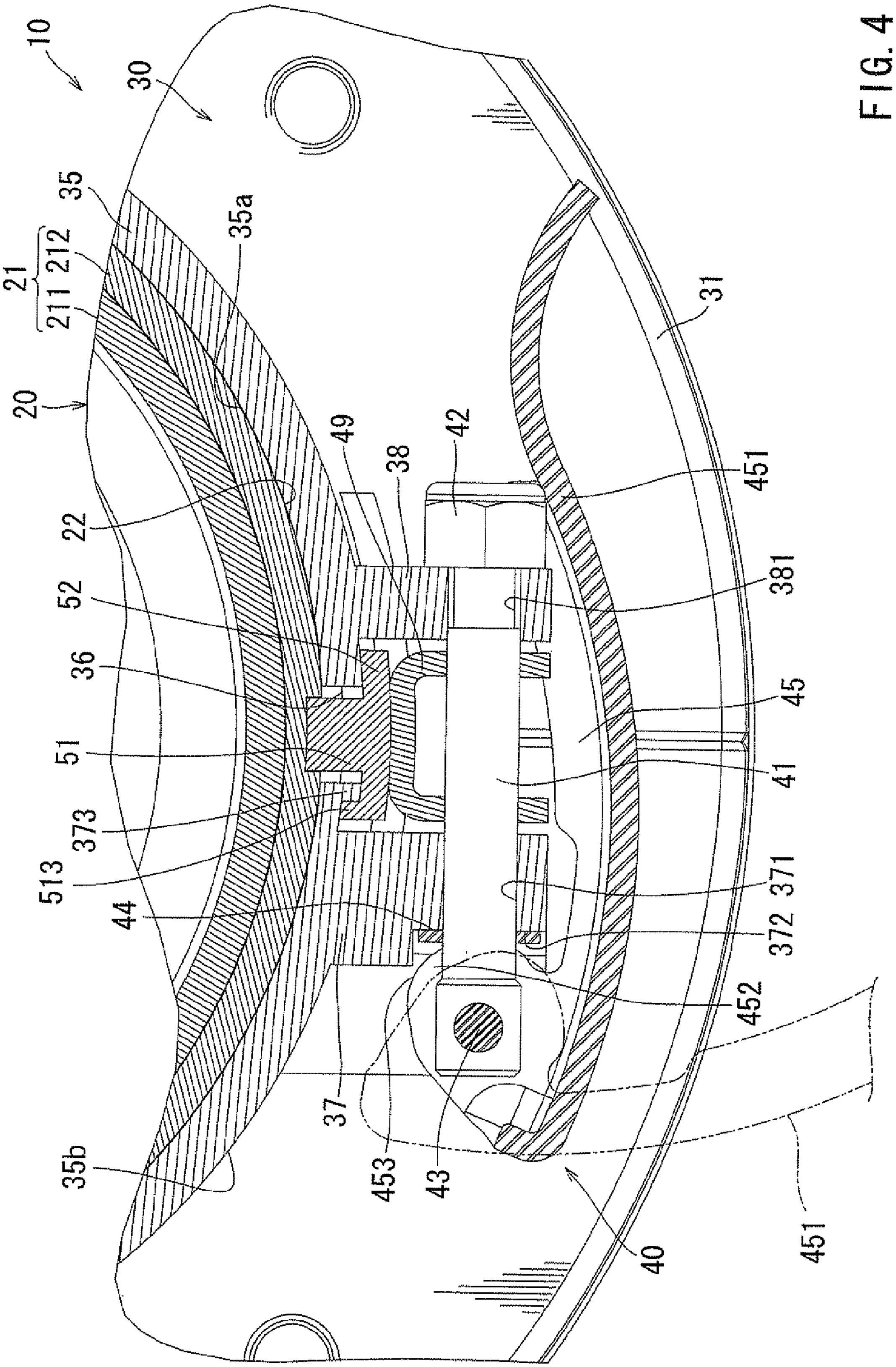
FIG. 4 is an enlarged cross-sectional view taken along line IV-IV of FIG. 1, which view illustrates a securing mechanism.
Figure 5:
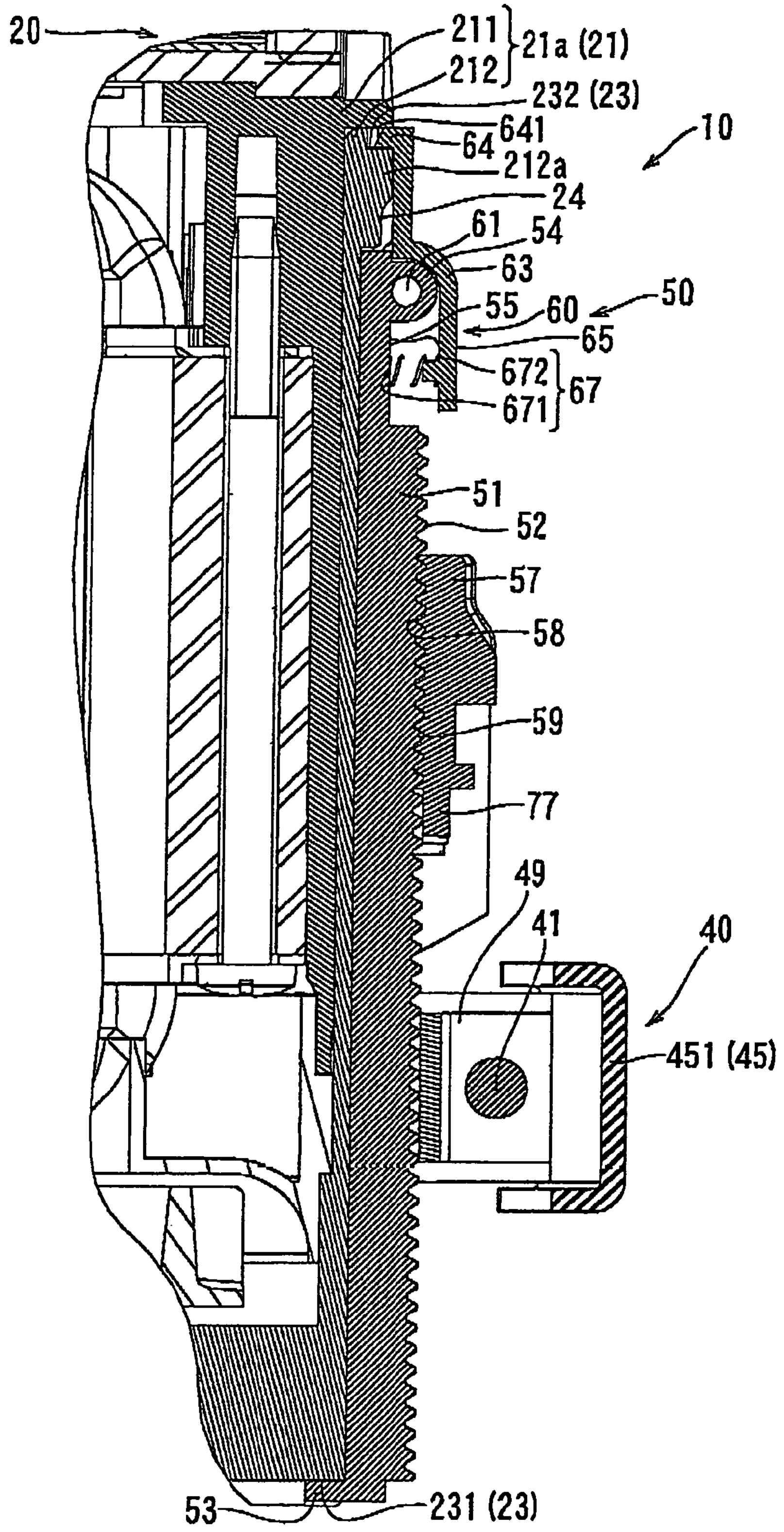
FIG. 5 is an enlarged cross-sectional view taken along line V-V of FIG. 1, which view illustrates an elevating mechanism.
Figure 6:
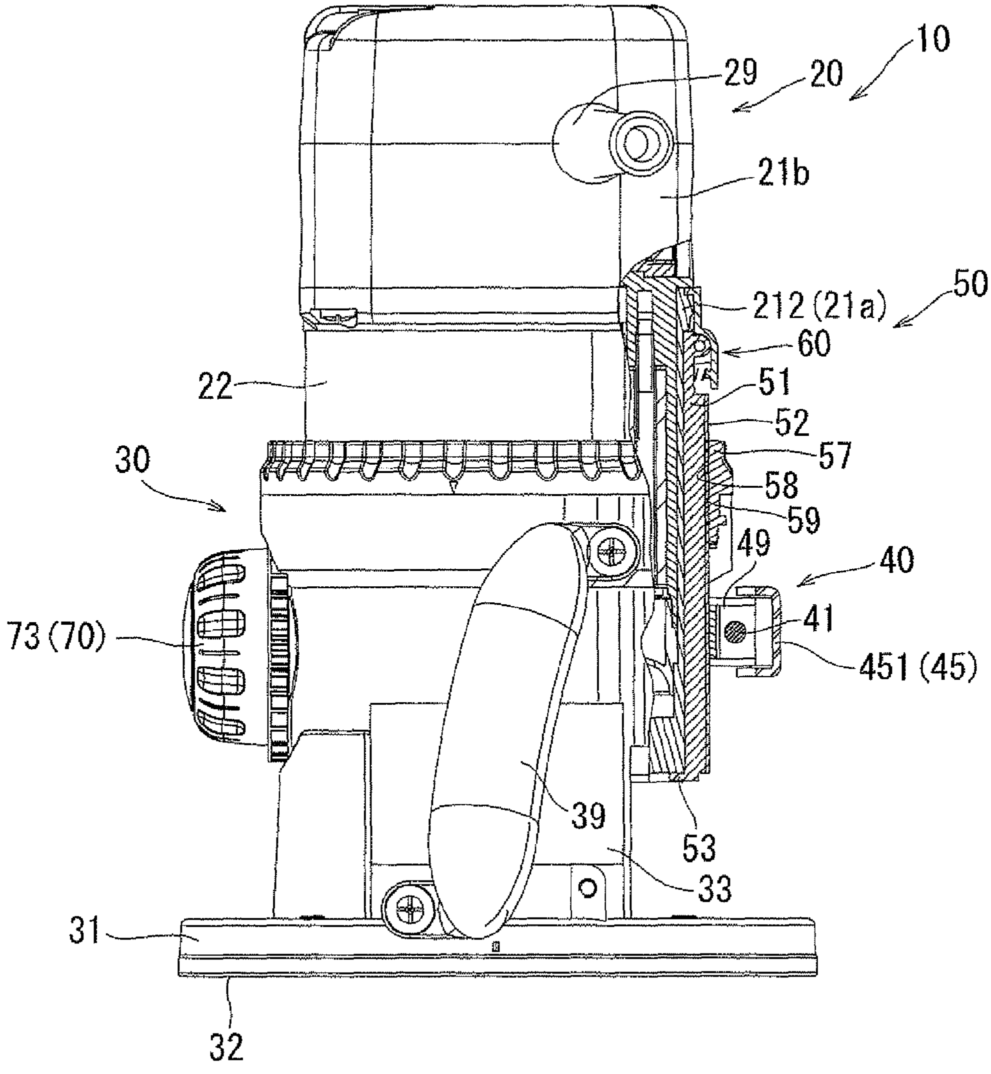
FIG. 6 is a partially cross-sectional side view of FIG. 1, in which the elevating mechanism is shown in cross section.

As shown in FIGS. 4 and 5, the cylindrical portion 21*a* of the housing 21 has a double structure. That is, the cylindrical portion 21*a* has an inner housing 211 made of an electrically insulating material (resin) and an outer housing 212 made of a metallic material. As best shown in FIG. 5, the outer housing 212 has a pair of flattened attachment surfaces 23, i.e., a lower flattened surface 231 and an upper flattened surface 232, for attaching the elevating mechanism 50 to the tool main body 20, which will be hereinafter described. The lower flattened surface 231 is formed in a lower end of the outer housing 212. Conversely, the upper flattened surface 232 is formed in a thickened portion 212*a* that is formed in an upper end of the outer housing 212.

As shown in FIGS. 1 and 2, the base 30 may preferably have a base plate portion 31, a cylindrical portion 35 projected upwardly from an upper surface of the base plate portion 31, and a pair of gripping portions 39 that are respectively attached to both sides of the cylindrical portion 35. The base plate portion 31 has a lower surface 32 (which may be referred to as a contacting surface or base surface 32 of the base 30) that is capable of contacting an upper surface of the work-piece L. Further, the cylindrical portion 35 may preferably be shaped to slidably receive the cylindrical portion 21*a* (the outer circumferential surface 22) of the housing 21, so that the cylindrical portion 21*a* of the housing 21 can be introduced into the base 30 (the cylindrical portion 35). Therefore, the housing 21 can be slidably coupled to the cylindrical portion 35 of the base 30, so that the tool main body 20 can be vertically movably attached to the base 30. The base 30 thus constructed can be disposed on the work-piece L while the base surface 32 contacts the upper surface of the work-piece L, so that the tool main body 20 can be positioned on the work-piece L.

Further, a relative position of the tool main body 20 to the base 30 can be adjusted by the elevating mechanism 50. Thereafter, the tool main body 20 can be secured to the base 30 at an adjusted position by the securing mechanism 40, which will be hereinafter described. As a result, a relative position of the tool bit B attached to the spindle 25 to the work-piece L can be is determined.

As shown in FIGS. 1 and 2, the cylindrical portion 35 of the base 30 is stably connected to the base plate portion 31 via a plurality of fin-shaped support members 33. Further, as shown in FIG. 4, the cylindrical portion 35 has a cylindrical bore 35*a*. The cylindrical bore 35*a* is shaped to closely contact the outer circumferential surface 22 of the housing cylindrical portion 21*a* when the cylindrical portion 21*a* is axially introduced into the cylindrical portion 35 in order to attach the tool main body 20 to the base 30.

As shown in FIG. 3, the cylindrical portion 35 has a vertically elongated cutout or removed portion 36 that is extended along an axial direction thereof. Thus, the cylindrical portion 35 can be radially contracted and restored by the securing mechanism 40. That is, a circumferential length of the cylindrical bore 35*a* of the cylindrical portion 35 can be shortened by the securing mechanism 40. Therefore, the cylindrical portion 35 can securely clamp and release the cylindrical portion 21*a* (the outer circumferential surface 22) of the housing 21 by contracting and restoring the same by the securing mechanism 40. As will be recognized, when the housing cylindrical portion 21*a* is axially introduced into the cylindrical bore 35*a* of the cylindrical portion 35, the outer circumferential surface 22 of the housing cylindrical portion 21*a* can be partially exposed exteriorly through the removed portion 36. Thus, the removed portion 36 of the cylindrical portion 35 can function as a circumferential length adjuster portion for controlling the circumferential length of the cylindrical bore 35*a* as well as an attachment portion through which the elevating mechanism 50 is attached to the tool main body 20.

As shown in FIGS. 1 and 2, the cylindrical portion 35 has an opening 33*a* that is formed between the support members 33. Therefore, the tool bit B attached to the spindle 25 can be seen therethrough when the housing cylindrical portion 21*a* is axially introduced into the cylindrical bore 35*a* of the cylindrical portion 35. That is, a user can identify a position of the tool bit B when the base 30 is disposed on the work-piece L in order to process the same.

As shown in FIG. 4, the cylindrical portion 35 has a left support projection 37 and a right support projection 38 that are oppositely positioned across the removed portion 36.

Each of the left support projection 37 and the right support projection 38 is projected outwardly. The left support projection 37 has a support bore 371 that is laterally formed therein. Further, the left support projection 37 has a cam contacting portion 372 that is formed in an outer surface thereof. Further, the left support projection 37 has a projected or male guide rib 373 that is positioned adjacent to the removed portion 36. Conversely, the right support projection 38 has a support bore 381 that is laterally formed therein. Further, the support bore 381 may preferably be laterally aligned with the support bore 371.

Next, the securing mechanism 40 will be described. The securing mechanism 40 is constructed to radially (circumferentially) contract the cylindrical portion 35 of the base 30, so as to secure the tool main body 20 to the base 30 at the adjusted position. That is, the securing mechanism 40 may function as a relative position securing mechanism to secure the relative position of the tool main body 20 to the base 30.

As shown in FIG. 4, the securing mechanism 40 may preferably have a transverse support shaft 41, a securing nut 42, a vertical pivot shaft 43, a contact washer 44 and a cam lever 45. The support shaft 41 is inserted into the support bores 371 and 381. As a result, the support shaft 41 can be supported by the left support projection 37 and the right support projection 38 of the cylindrical portion 35 while straddling the removed portion 36 of the cylindrical portion 35. At this time, the support shaft 41 can be positioned so as to extend along a tangential line to the cylindrical portion 35 at the removed portion 36. The securing nut 42 is positioned on an outer surface of the right support projection 38 and is threadably attached to a right end portion of the support shaft 41. As will be appreciated, the securing nut 42 may function as a stopper member that is capable of preventing the support shaft 41 from moving leftwardly.

Further, as shown in FIG. 4, the pivot shaft 43 is vertically attached to a left end portion of the support shaft 41 that is projected beyond the left support projection 37. The cam lever 45 is composed of a lever portion 451 and a cam portion 452 that is formed in a proximal portion of the lever portion 451. The lever portion 451 has a curved shape so as to be comfortably operated by the user. The cam portion 452 is rotatably connected to the pivot shaft 43, so that the cam lever 45 (the cam portion 452) can be horizontally rotatable thereabout. The contact washer 44 is attached to the cam contacting portion 372 of the left support projection 37, so that a cam surface 453 of a cam portion 452 of the cam lever 45 can contact the cam contacting portion 372 via the contact washer 44. Therefore, the cam portion 452 (the cam surface 453) of the cam lever 45 can smoothly slide on the cam contacting portion 372 when the cam lever 45 is rotated.

As shown in FIGS. 4 and 5, the securing mechanism 40 may further include a retainer member 49 that is positioned between the left support projection 37 and the right support projection 38 of the cylindrical portion 35. The retainer member 49 has a U-shape in cross section and is attached to and retained on the support shaft 41 that is passed therethrough.

Further, as shown in FIG. 4, the cam portion 452 of the cam lever 45 is shaped such that the cam surface 453 can contact and press the cam contacting portion 372 of the left support projection 37 to move the left support projection 37 toward the right support projection 38 when the cam lever 45 (the lever portion 451) is folded or closed as shown by solid lines in FIG. 4 and such that the cam surface 453 can be released from the cam contacting portion 372 of the left support projection 37 to return the left support projection 37 in a direction in which it is spaced from the right support projection 38 when the cam lever 45 (the lever portion 451) is unfolded or opened as shown by broken lines in FIG. 4. As will be recognized, when the left support projection 37 moves toward the right support projection 38, a distance between the left support projection 37 and the right support projection 38 (i.e., a width of the removed portion 36) can be reduced, so that the cylindrical portion 35 of the base 30 can be contracted. As a result, the cylindrical portion 21*a* (the outer circumferential surface 22) of the housing 21 can be clamped or fastened by the cylindrical portion 35. Therefore, the tool main body 20 can be secured to the base 30. To the contrary, when the left support projection 37 is moved in the direction in which it is spaced from the right support projection 38, the distance between the left support projection 37 and the right support projection 38 (i.e., the width of the removed portion 36) can be restored (widened), so that the cylindrical portion 35 of the base 30 can be sprung back. As a result, the cylindrical portion 21*a* of the housing 21 can be unfastened, so that the tool main body 20 can be released from the base 30. Therefore, the tool main body 20 can be vertically moved relative to the base 30, so that the relative position of the tool main body 20 to the base 30 can be freely changed. Thus, according to the securing mechanism 40, the tool main body 20 can be easily and quickly secured to and released from the base 30 by simply moving the cam lever 45, i.e., in one operation.

Next, the elevating mechanism 50 will be described. The elevating mechanism 50 is constructed to change and adjust the relative position of the tool main body 20 to the base 30. That is, the elevating mechanism 50 may function as a relative position adjusting mechanism for adjusting the position of the tool main body 20 relative to the base 30. The elevating mechanism 50 may preferably have an outer teeth member 51 (a first or male elevating member), a rotary ring 57 (a second or female elevating member), an integrating mechanism 60 and an operation dial mechanism 70.

The outer teeth member 51 is constructed to be detachably connected to or integrated with the tool main body 20 (the cylindrical portion 21*a* of the housing 21). As shown in FIG. 5, the outer teeth member 51 is formed as a toothed elongated plate or rack having a series of outer teeth 52 that are formed therealong. Further, as shown in FIG. 4, the outer teeth member 51 is shaped to be loosely received within the removed portion 36 of the cylindrical portion 35 while the outer teeth 52 are outwardly projected beyond an outer surface 35*b* of the cylindrical portion 35. Further, the outer teeth member 51 has a guide rib 513 that is formed therealong. The guide rib 513 is arranged and constructed to slidably contact the guide rib 373 formed in the cylindrical portion 35 (the left support projection 37) of the base 30 when the outer teeth member 51 is received within the removed portion 36 of the cylindrical portion 35. Therefore, the outer teeth member 51 can be reliably or stably positioned within the removed portion 36 of the cylindrical portion 35. As will be appreciated, when the outer teeth member 51 is positioned within the removed portion 36 of the cylindrical portion 35, the outer teeth 52 can be positioned in series in a raising and lowering direction of the tool main body 20.

Further, as shown in FIG. 5, the outer teeth member 51 has a lower engagement portion 53 that is formed in a lower end portion thereof. The lower engagement portion 53 is shaped to engage the lower flattened surface 231 of the outer housing 212 when the outer teeth member 51 is received within the removed portion 36 of the cylindrical portion 35. Further, the outer teeth member 51 has an apertured bearing portion 54 that is formed in an upper end portion thereof, and a recessed portion 55 that is positioned adjacent to the bearing portion 54.

The integrating mechanism 60 is attached to the upper end portion of the outer teeth member 51 so as to releasably connect the same to the upper flattened surface 231 of the outer housing 212. In particular, as best shown in FIG. 5, the integrating mechanism 60 may preferably have a pivot shaft 61, an engagement release lever 63 and a biasing member 67 (a coil spring). The pivot shaft 61 is horizontally attached to the bearing portion 54 of the outer teeth member 51. The engagement release lever 63 has an upper hook portion 64 and a lower operating portion 65 and is vertically rotatably attached to the bearing portion 54 of the outer teeth member 51 via the pivot shaft 61 at a central portion (a pivot center) thereof. The upper hook portion 64 is arranged and constructed to engage the upper flattened surface 232 of the outer housing 212 when the engagement release lever 63 is rotated counterclockwise in FIG. 5 about the pivot shaft 61. Also, the upper hook portion 64 is arranged and constructed to be disengaged from the upper flattened surface 232 when the engagement release lever 63 is rotated clockwise in FIG. 5. That is, the engagement release lever 63 is arranged and constructed to move or rotate between an engaged position shown in FIG. 5 and a disengaged position (not shown). Further, the biasing member 67 is disposed within the recessed portion 55 of the outer teeth member 51 so as to bias the engagement release lever 63 counterclockwise in FIG. 5. In particular, the biasing member 67 has a support end 671 that is positioned in the recessed portion 55 and a biasing end 672 that biases the lower operating portion 65 of the engagement release lever 63 outwardly (i.e., in an engaging direction of the engagement release lever 63). Therefore, the engagement release lever 63 can normally be maintained in the engaged position.

As described above, the lower end portion of the outer teeth member 51 can be connected to the lower flattened surface 231 of the outer housing 212 via the lower engagement portion 53. Conversely, the upper end portion of the outer teeth member 51 can be connected to the upper flattened surface 232 of the outer housing 212 via the integrating mechanism 60. Thus, the outer teeth member 51 can be integrated with the cylindrical portion 21*a* of the housing 21 (the tool main body 20) while it is received within the removed portion 36 of the cylindrical portion 35 of the base 30. As a result, the tool main body 20 can be integrated with the base 30.

In order to disengage the outer teeth member 51 from the tool main body 20, the lower operating portion 65 of the engagement release lever 63 can be simply pressed inwardly against a biasing force of the biasing member 67 to rotate the engagement release lever 63 clockwise from the engaged position toward the disengaged position. Upon rotation of the engagement release lever 63, the upper hook portion 64 is disengaged from the upper flattened surface 232 of the outer housing 212, so that the integrating mechanism 60 can be released. Thus, the outer teeth member 51 can be disengaged from the tool main body 20.

When the outer teeth member 51 is disengaged from the tool main body 20, the tool main body 20 can be separated from the cylindrical portion 35 of the base 30. Therefore, the tool main body 20 can be removed or detached from the base 30 (FIG. 7) while the outer teeth member 51 is left or held within the removed portion 36 of the cylindrical portion 35 of the base 30.

To the contrary, in order to attach the tool main body 20 to the base 30, the tool main body 20 can be simply introduced or inserted into the cylindrical portion 35 of the base 30 from a lower end thereof. As will be recognized, after the thickened portion 212*a* formed in the upper end of the outer housing 212 contacts the upper hook portion 64 of the engagement release lever 63, the tool main body 20 can be introduced into the cylindrical portion 35 while the engagement release lever 63 is rotated clockwise against the biasing force of the biasing member 67. When the tool main body 20 is completely inserted into the cylindrical portion 35 until the lower flattened surface 231 of the outer housing 212 contacts the lower engagement portion 53 of the outer teeth member 51, the engagement release lever 63 can be rotated counterclockwise by the biasing force of the biasing member 67. Upon rotation of the engagement release lever 63, the upper hook portion 64 engages the upper flattened surface 232 of the outer housing 212, so that the integrating mechanism 60 can be actuated. Thus, the outer teeth member 51 can be integrated with the tool main body 20. As a result, the tool main body 20 can be integrated with or attached to the base 30.

Further, as best shown in FIG. 5, guide surfaces 24 and 641 (guide portions) may preferably respectively be formed in the thickened portion 212*a* of the outer housing 212 and the upper hook portion 64 of the engagement release lever 63. Therefore, when the tool main body 20 is introduced into the cylindrical portion 35 of the base 30 after the thickened portion 212*a* of the outer housing 212 contacts the upper hook portion 64 of the engagement release lever 63, the engagement release lever 63 can be guided by the tool main body 20 via the guide surfaces 24 and 641, so as to be automatically rotated clockwise against the biasing force of the biasing member 67. Therefore, the outer teeth member 51 can be automatically integrated with the tool main body 20 by simply inserting the tool main body 20 into the cylindrical portion 35 of the base 30.

The rotary ring 57 is intended to vertically move the outer teeth member 51 (the tool main body 20) relative to the base 30. The rotary ring 57 is rotatably attached to the cylindrical portion 35 of the base 30. In particular, the rotary ring 57 is attached the outer surface 35*b* of the cylindrical portion 35 so as to be rotatable in a circumferential direction thereof. Further, the rotary ring 57 is arranged and constructed to not vertically move along the cylindrical portion 35 of the base 30.

As shown in FIG. 5, the rotary ring 57 has an inner tooth 58 (a helical tooth) that is formed in an inner surface thereof. The inner tooth 58 meshes with the outer teeth 52 of the outer teeth member 51. Further, a condition in which the inner tooth 58 of the rotary ring 57 meshes with the outer teeth 52 of the outer teeth member 51 is shown by a referential numeral 59. Therefore, when the rotary ring 57 is rotated, the outer teeth member 51 can be vertically moved (raised and lowered) relative to the rotary ring 57. As a result, the outer teeth member 51 can be vertically moved relative to the base 30 because the rotary ring 57 is attached to the cylindrical portion 35 of the base 30 so as to not be vertically moved. As described above, the outer teeth member 51 is integrated with the tool main body 20 by the integrating mechanism 60. Therefore, upon rotation of the rotary ring 57, the tool main body 20 can be vertically moved (raised and lowered) relative to the base 30.

Figure 8:
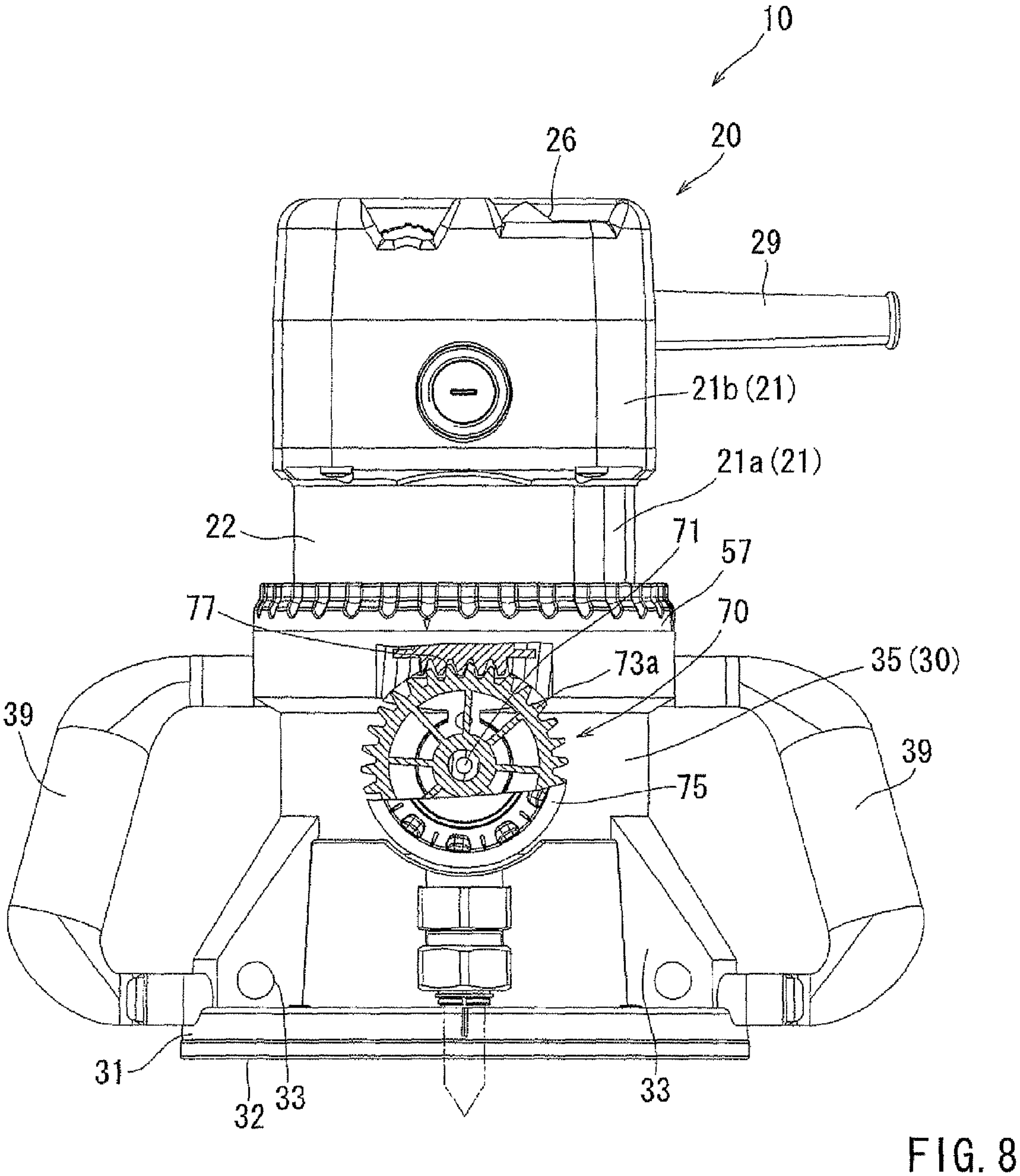
FIG. 8 is a partially cross-sectional rear view of FIG. 1, in which an operating dial mechanism is shown in cross section.

As best shown in FIG. 8, the operation dial mechanism 70 is rotatably attached to the cylindrical portion 35 of the base 30 so as to be associated with the rotary ring 57. Further, the operation dial mechanism 70 is positioned such that a rotational plane thereof is perpendicular to a rotational plane of the rotary ring 57. In particular, the operation dial mechanism 70 is composed of an operation gear 73 that is rotatably connected to the cylindrical portion 35 via a rotation shaft 71, and an operation dial 75 that is integrally attached to the operation gear 73. The operation gear 73 has gear teeth 73*a* that are formed therearound. The gear teeth 73*a* of the operation gear 73 are meshed with gear teeth 77 that are formed in a lower circumferential periphery of the rotary ring 57. Therefore, when the operation dial 75 is rotated, the operation gear 73 is integrally rotated. As a result, the rotary ring 57 can be rotated around the cylindrical portion 35 of the base 30 because the gear teeth 73*a* of the operation gear 73 are meshed with the gear teeth 77 of the rotary ring 57.

An operation of the electrical power tool 10 thus constructed will now be described with reference to FIGS. 1, 2 and 6 to 8.

In order to attach the tool main body 20 to the base 30, the tool main body 20 can be simply introduced or inserted into the cylindrical portion 35 of the base 30 while the cam lever 45 (the lever portion 451) is unfolded or opened as shown by broken lines in FIG. 4. After the thickened portion 212*a* formed in the upper end of the outer housing 212 contacts the upper hook portion 64 of the engagement release lever 63, the tool main body 20 can be introduced into the cylindrical portion 35 while the engagement release lever 63 is rotated clockwise against the biasing force of the biasing member 67. When the tool main body 20 is completely inserted into the cylindrical portion 35 until the lower flattened surface 231 of the outer housing 212 contacts the lower engagement portion 53 of the outer teeth member 51, the engagement release lever 63 can be automatically rotated counterclockwise by the biasing force of the biasing member 67. Upon rotation of the engagement release lever 63, as shown in FIG. 5, the upper hook portion 64 engages the upper flattened surface 232 of the outer housing 212, so that the integrating mechanism 60 can be actuated. Thus, the outer teeth member 51 can be integrated with the tool main body 20. As a result, the tool main body 20 can be integrated with or attached to the base 30 via the outer teeth member 51.

Subsequently, the operation dial 75 is rotated so as to rotate the operation gear 73. Upon rotation of the operation gear 73, the rotary ring 57 can be rotated around the cylindrical portion 35 of the base 30, so that the outer teeth member 51 can be vertically moved (raised and lowered) relative to the base 30. As a result, the tool main body 20 can be vertically moved (raised and lowered) relative to the base 30. Thus, the relative position of the tool main body 20 to the base 30 can be adjusted to a desired position. After the desired position of the tool main body 20 relative to the base 30 is determined, the cam lever 45 (the lever portion 451) is folded or closed as shown by solid lines in FIG. 4, so that the cylindrical portion 21*a* of the housing 21 of the tool main body 20 can be fastened. Thus, the tool main body 20 can be secured to the base 30 (FIG. 6) at the adjusted position.

Figure 7:
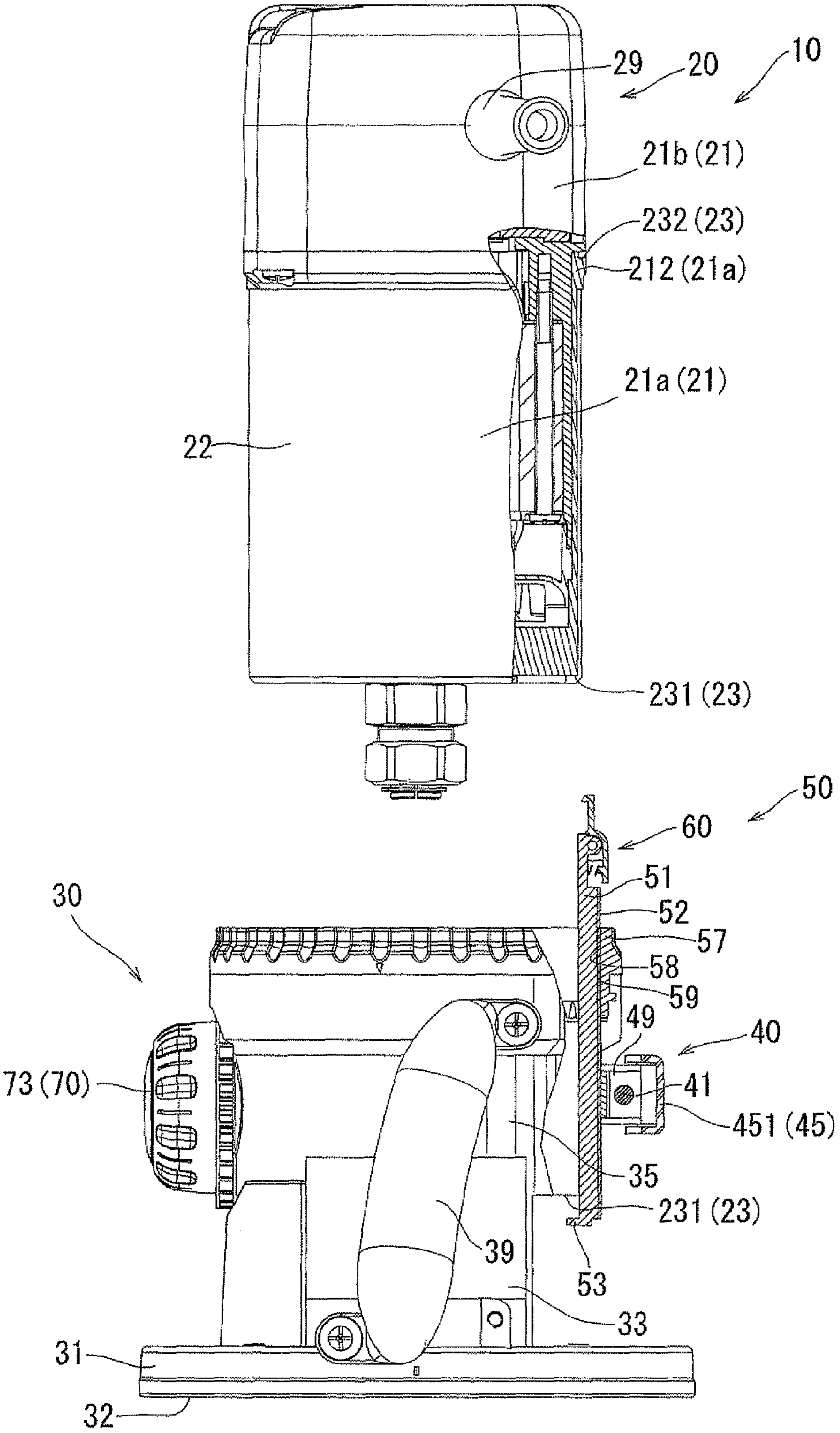
FIG. 7 is a partially cross-sectional side view of FIG. 2, in which the elevating mechanism is shown in cross section.

To the contrary, in order to detach the tool main body 20 from the base 30, the cam lever 45 (the lever portion 451) is unfolded or opened as shown by broken lines in FIG. 4. As a result, the cylindrical portion 21*a* of the housing 21 can be unfastened, so that the tool main body 20 can be released from the base 30. Thereafter, the lower operating portion 65 of the engagement release lever 63 is pressed inwardly against the biasing force of the biasing member 67 to disengage the upper hook portion 64 from the upper flattened surface 232 of the outer housing 212, so that the outer teeth member 51 can be disengaged from the tool main body 20. In this condition, the tool main body 20 can be simply pulled out of the cylindrical portion 35 of the base 30. Thus, the tool main body 20 can be removed or detached from the base 30 (FIG. 7).

According to the electrical power tool 10 thus constructed, when the tool main body 20 is introduced into the cylindrical portion 35 of the base 30, the engagement release lever 63 can be guided by the tool main body 20 via the guide surfaces 24 and 641. Therefore, the outer teeth member 51 can be automatically integrated with the tool main body 20 by simply inserting the tool main body 20 into the cylindrical portion 35 of the base 30. Thus, the tool main body 20 can be easily attached to the base 30 by simply inserting the tool main body 20 into the cylindrical portion 35 of the base 30.

Further, the relative position of the tool main body 20 to the base 30 can be adjusted to the desired position by simply rotating the rotary ring 57 (the operation dial 75). Further, the tool main body 20 can be easily secured to the base 30 at the adjusted position by folding or closing the cam lever 45 (the lever portion 451).

Further, the outer teeth member 51 can engage the tool main body 20 at both (upper and lower) end portions in the raising and lowering direction thereof. Therefore, the outer teeth member 51 can be reliably and securely integrated with the tool main body 20.

Conversely, the integrating mechanism 60 can be easily released by pressing the lower operating portion 65 of the engagement release lever 63. That is, the outer teeth member 51 can be easily disengaged from the tool main body 20 by pressing the lower operating portion 65 of the engagement release lever 63. Therefore, the tool main body 20 can be easily and quickly removed from the base 30 by pressing the lower operating portion 65 of the engagement release lever 63 after the cam lever 45 (the lever portion 451) is unfolded or opened.

Further, the tool main body 20 can be removed from the base 30 while the outer teeth member 51 is left in the base 30. Therefore, it is not necessary to disengage the rotary ring 57 (an element of the elevating mechanism 50) from the outer teeth member 51 (an element of the elevating mechanism 50) in order to remove the tool main body 20 from the base 30. As a result, the tool main body 20 can be further easily and quickly removed from the base 30. In addition, the removed tool main body 20 can be directly used separately from the base 30 without any additional operations.

Various changes and modifications may be made to the present invention without departing from the scope of the previously shown and described embodiment. For example, in the embodiment, the securing mechanism 40 is constructed of the transverse support shaft 41, the securing nut 42, the vertical pivot shaft 43, the contact washer 44 and the cam lever 45. However, the securing mechanism 40 can be replaced with various types of mechanisms provided that such mechanisms are capable of reliably securing the tool main body 20 to the base 30 at the adjusted position.

Further, in the embodiment, the elevating mechanism 50 includes the outer teeth member 51 (the male elevating member) having the outer teeth 52, and the rotary ring 57 (the female elevating member) having the inner tooth 58. However, the elevating mechanism 50 can be replaced with various types of mechanisms provided that such mechanisms are capable of vertically moving (raising and lowering) the tool main body 20 relative to the base 30. For example, the outer teeth 52 and the inner tooth 58 can be appropriately changed in shape and type.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. An electrical power tool to process a work-piece, comprising:

a base having a base surface that is capable of contacting the work-piece;

a tool main body detachably attached to the base and having a spindle to which a tool bit can be attached; and an elevating mechanism that is capable of changing a relative position of the tool main body to the base, wherein the elevating mechanism includes a male elevating member that is releasably integrated with the tool main body via an integrating mechanism and vertically movably attached to the base, and a female elevating member that is attached to the base and is capable of relatively raising and lowering the male elevating member, wherein the tool main body is configured to be removed and spaced from the base while the male elevating member is left in the base when the male elevating member is released from the tool main body by operating the integrating mechanism, wherein the male elevating member engages the tool main body at both end portions of the male elevating member in a raising and lowering direction thereof, wherein the integrating mechanism includes an engagement release lever that is attached to one of the end portions of the male elevating member, and wherein the engagement release lever is arranged and constructed to release the male elevating member from the tool main body.

2. The electrical power tool as defined in claim 1, wherein the male elevating member has outer teeth that are arranged in series in a raising and lowering direction of the tool main body, wherein the female elevating member has a ring shape and has inner tooth meshing with the outer teeth of the male elevating member, and wherein the outer teeth of the male elevating member and the inner tooth of the female elevating member are respectively shaped such that the male elevating member can be raised and lowered relative to the female elevating member when the female elevating member is rotated relative to the male elevating member.

3. The electrical power tool as defined in claim 1, wherein at least one of the tool main body and the integrating mechanism has a guide portion formed therein, and wherein the guide portion is arranged and constructed such that the engagement release lever can be guided by the tool main body when the tool main body is introduced into the base in order to attach the tool main body to the base, so that the male elevating member can be automatically integrated with the tool main body.

4. An electrical power tool, comprising:

a base;

a tool main body detachably attached to the base; and an elevating mechanism that is capable of raising and lowering the tool main body relative to the base, wherein the elevating mechanism includes a first elevating member that is releasably integrated with the tool main body via an integrating mechanism and movably attached to the base, and a second elevating member that is attached to the base, wherein the first elevating member and the second elevating member are arranged and constructed to be relatively moved to each other, wherein the tool main body is capable of being detached from the base by operating the integrating mechanism for releasing the first elevating member therefrom, and wherein the integrating mechanism includes an engagement release lever that is arranged and constructed to be engaged with and disengaged from the tool main body.

5. The electrical power tool as defined in claim 4, wherein the first elevating member has outer teeth that are arranged in series in a raising and lowering direction of the tool main body, wherein the second elevating member has inner tooth meshing with the outer teeth of the first elevating member, and wherein the outer teeth of the first elevating member and the inner tooth of the second elevating member are respectively shaped such that the first elevating member can be moved relative to the second elevating member when the second elevating member is operated.

6. The electrical power tool as defined in claim 4, wherein the first elevating member engages the tool main body at both end portions of the first elevating member in a moving direction thereof, and wherein the engagement release lever is attached to one of the end portions of the first elevating member.

7. The electrical power tool as defined in claim 5, wherein the first elevating member is formed as an elongated plate in which the outer teeth are formed therealong, and wherein the second elevating member is formed as a rotary ring in which the inner tooth is helically formed in an inner surface thereof.

8. The electrical power tool as defined in claim 4, wherein at least one of the tool main body and the engagement release lever has a guide portion formed therein, and wherein the guide portion is arranged and constructed such that the engagement release lever can be automatically operated by the tool main body when the tool main body is introduced into the base.

9. The electrical power tool as defined in claim 8, wherein the engagement release lever is biased in an engaging direction thereof, so as to be automatically engaged with the tool main body when the tool main body is attached to the base.

10. The electrical power tool as defined in claim 4, wherein the base has an operation dial mechanism that is capable of operating the second elevating member.

11. The electrical power tool as defined in claim 4, wherein the base has a cam lever that is capable of securing the tool main body to the base or releasing the same therefrom.

* * * * *